United States Patent
Washio

(10) Patent No.: US 10,497,101 B2
(45) Date of Patent: Dec. 3, 2019

(54) IMAGE PROCESSING APPARATUS AND IMAGE PROCESSING METHOD

(71) Applicant: Konica Minolta, Inc., Chiyoda-ku, Tokyo (JP)

(72) Inventor: Koji Washio, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 182 days.

(21) Appl. No.: 15/887,270

(22) Filed: Feb. 2, 2018

(65) Prior Publication Data
US 2018/0225809 A1 Aug. 9, 2018

(30) Foreign Application Priority Data

Feb. 6, 2017 (JP) .................................. 2017-019389

(51) Int. Cl.
| | |
|---|---|
| *G06K 9/40* | (2006.01) |
| *G06T 5/00* | (2006.01) |
| *G06T 7/13* | (2017.01) |
| *H04N 1/41* | (2006.01) |

(Continued)

(52) U.S. Cl.
CPC .............. *G06T 5/003* (2013.01); *G06T 5/008* (2013.01); *G06T 7/13* (2017.01); *H04N 1/4092* (2013.01); *H04N 1/41* (2013.01); *G03G 15/5087* (2013.01); *G03G 15/556* (2013.01); *G03G 2215/047* (2013.01); *G06T 2207/10008* (2013.01); *G06T 2207/20192* (2013.01)

(58) Field of Classification Search
None
See application file for complete search history.

(56) References Cited

U.S. PATENT DOCUMENTS 5,696,842 A * 12/1997 Shirasawa ................ H04N 1/41
358/462
6,933,953 B2 * 8/2005 Dantwala .................. G06T 5/20
345/617

(Continued)

FOREIGN PATENT DOCUMENTS

| JP | 7-175367 A | 7/1995 |
|---|---|---|
| JP | 10-142856 A | 5/1998 |

(Continued)

*Primary Examiner* — Feng Niu
(74) *Attorney, Agent, or Firm* — Buchanan Ingersoll & Rooney PC

(57) ABSTRACT

An image processing apparatus includes: an extractor that divides image data in block units and extracts a maximum value and a minimum value of each block from the compressed image data; an edge detector that detects an edge at a front end or a rear end of an image; a correction value calculator that corrects the maximum value, or the maximum value and the minimum value of each block positioned in a certain range from the front end or the rear end and calculates a maximum value and a minimum value after the correction; and a converter that determines a conversion formula of a pixel value by using the maximum value and the minimum value before the correction and the maximum value and the minimum value after the correction and converts each pixel value of the image data obtained by decompressing the compressed data so as to apply sweeping correction.

12 Claims, 10 Drawing Sheets

(51) Int. Cl.
*H04N 1/409* (2006.01)
*G03G 15/00* (2006.01)

(56) References Cited

U.S. PATENT DOCUMENTS

| | | | | |
|---|---|---|---|---|
| 7,365,878 B2* | 4/2008 | Nakagawa | ............ | H04N 1/622 |
| | | | | 358/1.9 |
| 7,386,185 B2* | 6/2008 | Watanabe | ............ | H04N 1/6027 |
| | | | | 345/20 |
| 7,734,103 B2* | 6/2010 | Sato | ............ | H04N 1/648 |
| | | | | 382/232 |
| 8,254,710 B2* | 8/2012 | Genda | ............ | H04N 1/41 |
| | | | | 382/173 |
| 8,264,499 B1* | 9/2012 | Landry | ............ | H04N 5/57 |
| | | | | 345/581 |
| 8,345,061 B1* | 1/2013 | Landry | ............ | H04N 5/57 |
| | | | | 345/581 |
| 8,442,336 B2* | 5/2013 | Genda | ............ | H04N 1/40062 |
| | | | | 382/239 |
| 8,494,303 B2* | 7/2013 | Watanabe | ............ | H04N 1/6027 |
| | | | | 345/20 |
| 10,388,021 B2* | 8/2019 | Genda | ............ | H04N 1/41 |
| 2005/0117812 A1* | 6/2005 | Nishi | ............ | H04N 19/176 |
| | | | | 382/268 |
| 2012/0045144 A1* | 2/2012 | Kanemitsu | ............ | H04N 5/208 |
| | | | | 382/266 |

FOREIGN PATENT DOCUMENTS

| | | |
|---|---|---|
| JP | 11-196277 A | 7/1999 |
| JP | 11-346315 A | 12/1999 |
| JP | 2009-58765 A | 3/2009 |

* cited by examiner

FIG. 13

| MAXIMUM VALUE AND MINIMUM VALUE AFTER CORRECTION | IMAGE DATA TO WHICH IMAGE PROCESSING HAS BEEN PERFORMED AFTER DECOMPRESSION | | | | IMAGE DATA TO WHICH SWEEPING CORRECTION HAS BEEN PERFORMED | | | | |
|---|---|---|---|---|---|---|---|---|---|
| B11 — Max* = 220 min* = 220 | 180 | 180 | 180 | 180 | 155 | 155 | 155 | 155 | |
| | 180 | 180 | 180 | 180 | 155 | 155 | 155 | 155 | |
| | 180 | 180 | 180 | 180 | 155 | 155 | 155 | 155 | |
| | 180 | 180 | 180 | 180 | 155 | 155 | 155 | 155 | |
| B12 — Max* = 200 min* = 0 | 180 | 180 | 180 | 180 | 141 | 141 | 141 | 141 | EDGE |
| | 0 | 0 | 0 | 0 | 0 | 0 | 0 | 0 | |
| | 0 | 0 | 0 | 0 | 0 | 0 | 0 | 0 | |
| | 0 | 0 | 0 | 0 | 0 | 0 | 0 | 0 | |
| B13 — Max* = 0 min* = 0 | 0 | 0 | 0 | 0 | 0 | 0 | 0 | 0 | |
| | 0 | 0 | 0 | 0 | 0 | 0 | 0 | 0 | |
| | 0 | 0 | 0 | 0 | 0 | 0 | 0 | 0 | |
| | 0 | 0 | 0 | 0 | 0 | 0 | 0 | 0 | |
| B14 — Max* = 0 min* = 0 | 0 | 0 | 0 | 0 | 0 | 0 | 0 | 0 | |
| | 0 | 0 | 0 | 0 | 0 | 0 | 0 | 0 | |
| | 0 | 0 | 0 | 0 | 0 | 0 | 0 | 0 | |
| | 0 | 0 | 0 | 0 | 0 | 0 | 0 | 0 | |

↑
SHIFT DIRECTION
Dy

IMAGE PROCESSING APPARATUS AND IMAGE PROCESSING METHOD

The entire disclosure of Japanese patent Application No. 2017-019389, filed on Feb. 6, 2017, is incorporated herein by reference in its entirety.

BACKGROUND

Technological Field

The present invention relates to an image processing apparatus and an image processing method.

Description of the Related Art

In an electrophotographic image forming apparatus, a phenomenon in which a quality of an image near an edge deteriorates occurs in some cases. A phenomenon called toner sweeping is one of the phenomena. When sweeping occurs, a density of the edge fluctuates by unevenness of the toner near the edge, contours of characters and figures are unbalanced, and the image quality is deteriorated. The degree of sweeping or blurring varies depending on image forming conditions. However, the sweeping or blurring may occur in a range of about 0.6 mm.

Methods for improving the deteriorated image quality due to the fluctuation of the density by image processing have been proposed (for example, refer to JP 2009-58765 A, JP 11-196277 A, and JP 11-346315 A). For example, a region where the density fluctuation occurs due to the toner sweeping is estimated based on the edge of the character or the figure which is detected by analyzing the image data. In a region where the density is decreased, correction for increasing the pixel value is applied, and in a region where the density is increased, correction for decreasing the pixel value is applied.

Methods of detecting the density fluctuation of the image by a sensor and adjusting development conditions according to the detected density fluctuation have been proposed (for example, refer to JP 7-175367 A and JP 10-142856 A).

On the other hand, to achieve high image quality, resolution enhancement of image data has been promoted, and there are cases where image processing is performed with a plurality of resolutions such as 600 dpi, 1200 dpi, 2400 dpi, and the like. However, to cope with high-resolution image data, it is necessary to mount a large number of line memories in an image processing circuit. For example, the range of 0.6 mm described above corresponds to 14 pixels at the resolution of 600 dpi, and the line memories for 14 lines are necessary for sweeping correction. The line memories which can hold 28 lines are necessary at the resolution of 1200 dpi, and the line memories which can hold 54 lines are necessary at the resolution of 2400 dpi. The trend of resolution enhancement causes an increase in cost.

To reduce the line memories to avoid the increase in cost, a method of applying correction relative to the compressed image data can be considered. An image forming apparatus is separated into a controller which generates bitmap image data by rasterizing processing and an engine which forms an image onto a paper sheet based on the image data. The image forming apparatus compresses the image data to improve a transfer efficiency at the time of transferring the image data from the controller to the engine. The correction can be applied to the image data which is compressed, and it can be said that this is an efficient method.

One method of compressing the image data is BTC compression. The BTC compression is a method of dividing image data in block units and coding each pixel value in the block using the maximum value and the minimum value of each pixel value in the block. After the sweeping correction has been applied to the maximum value and the minimum value, the maximum value and the minimum value of each block of the compressed image data are replaced with the corrected maximum value and minimum value, and decompression processing is applied to the replaced values. Accordingly, the sweeping correction can be applied to the image data in a compressed state.

However, from the viewpoint of circuit scale and cost reduction, to form an actual circuit, it is desirable that a circuit for the sweeping correction be arranged in parallel to other image processing circuits which similarly need the plurality of lines of line memories. In this case, since the sweeping correction processing relative to the compressed image data and the other image processing relative to the decompressed image data are performed in parallel, before the decompression processing, the maximum value and the minimum value of each block cannot be replaced with the maximum value and the minimum value before the sweeping correction. Even if the replacement is performed, a range between the minimum value and the maximum value of each block is changed by the sweeping correction, and a range between the maximum value and the minimum value of each block of the decompressed image data is changed by the other image processing. Therefore, each pixel value in the block which has been within the range from the minimum value to the maximum value before the correction is not positioned in the range after the correction, and the output becomes unstable.

After the other image processing has been applied to the decompressed image data, if the image data is compressed again and the maximum value and the minimum value of each block are replaced with the maximum value and the minimum value after the sweeping correction, the output becomes stable. However, further decompression is required after that. This makes the processing be complicated and increases the circuit size.

SUMMARY

An object of the present invention is to calculate a sweeping correction value from compressed image data and apply sweeping correction to the image data decompressed by using the correction value.

To achieve the abovementioned object, according to an aspect of the present invention, an image processing apparatus reflecting one aspect of the present invention comprises:

an extractor that divides image data in block units and extracts a maximum value and a minimum value of each block from the compressed image data by using a maximum value and a minimum value of pixel values of pixels included in each block;

an edge detector that detects an edge at a front end or a rear end of an image by using the maximum value and the minimum value of each block extracted by the extractor;

a correction value calculator that corrects the maximum value, or the maximum value and the minimum value of each block positioned in a certain range from the front end or the rear end of the image according to a distance from the edge detected by the edge detector and calculates a maximum value and a minimum value after the correction; and a converter that determines a conversion formula of a pixel value by using the maximum value and the minimum value before the correction of each block and the maximum value and the minimum value after the correction calculated by the correction value calculator and converts each pixel value of the image data obtained by decompressing the compressed data according to the determined conversion formula so as to apply sweeping correction.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 13 is a diagram of an example of image data to which sweeping correction is applied by conversion.

DETAILED DESCRIPTION OF EMBODIMENTS

Hereinafter, one or more embodiments of an image processing apparatus and an image processing method according to the present invention will be described with reference to the drawings. However, the scope of the invention is not limited to the disclosed embodiments.

Figure 1:
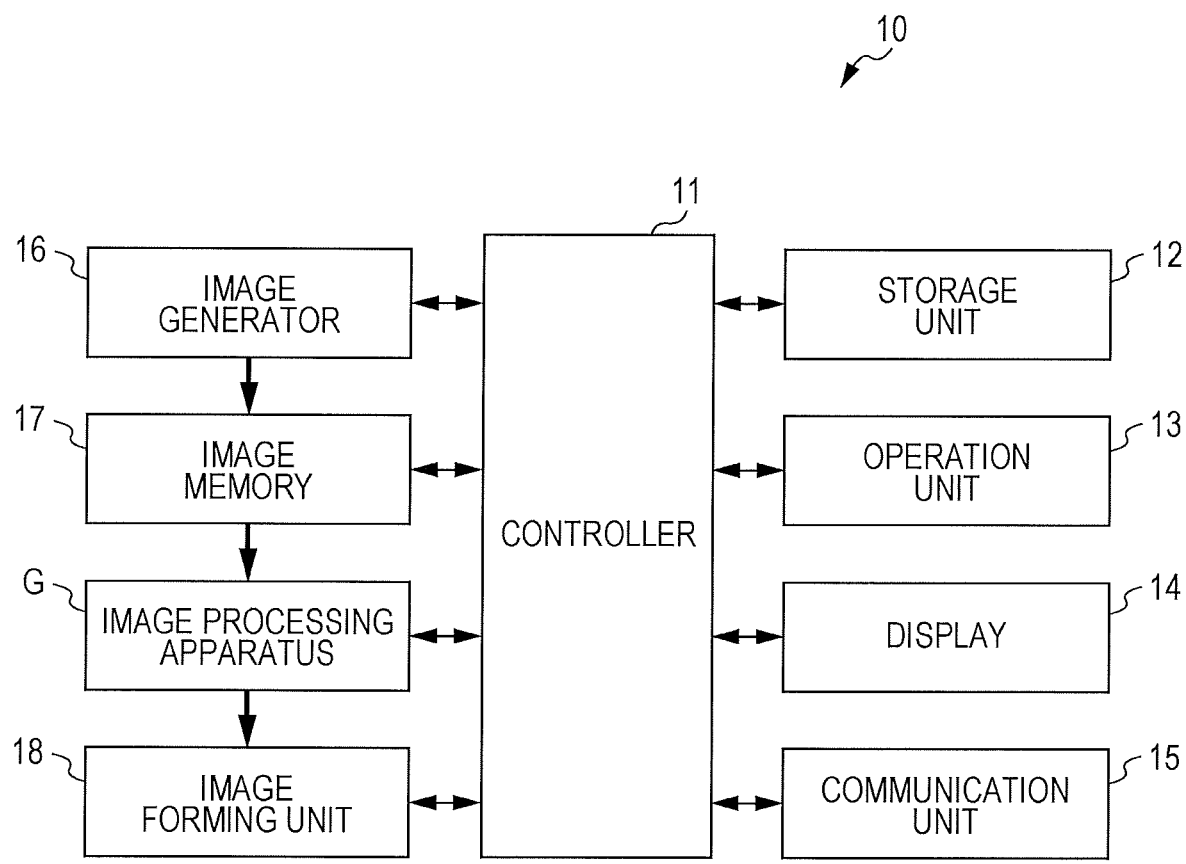
FIG. 1 is a block diagram of a configuration of an image forming apparatus for each function.

In FIG. 1, a configuration of an electrophotographic image forming apparatus 10 including an image processing apparatus G according to the embodiment of the present invention mounted thereon is illustrated for each function.

As illustrated in FIG. 1, the image forming apparatus 10 includes a controller 11, a storage unit 12, an operation unit 13, a display 14, a communication unit 15, an image generator 16, an image memory 17, an image processing apparatus G, an image forming unit 18, and the like.

The controller 11 includes a central processing unit (CPU), a random access memory (RAM), and the like and controls each unit by reading and executing various programs from the storage unit 12.

For example, the controller 11 compresses image data generated by the image generator 16, stores the image data in the storage unit 12, and transfers the image data from the storage unit 12 to the image memory 17. The controller 11 makes the image processing apparatus G perform image processing to the image data which has been transferred to the image memory 17 and makes the image forming unit 18 form an image on a paper sheet based on the image data to which the image processing has been applied.

The storage unit 12 stores a program which can be read by the controller 11, a file used when the program is executed, compressed image data, and the like. As the storage unit 12, a large capacity memory such as a hard disk can be used.

The operation unit 13 generates an operation signal according to a user's operation and outputs the operation signal to the controller 11. As the operation unit 13, a keypad, a touch panel integrated with the display 14, and the like can be used.

The display 14 displays an operation screen or the like according to an instruction by the controller 11. As the display 14, a liquid crystal display (LCD), an organic electro luminescence display (OELD), and the like can be used.

The communication unit 15 communicates with an external device on a network, for example, a user terminal, a server, other image forming apparatus, and the like.

The communication unit 15 receives data (referred to as PDL data below) in which an instruction content for forming an image is described in a page description language (PDL) from the user terminal and the like via the network.

The image generator 16 is also referred to as a print controller, and performs rasterizing processing to the PDL data received by the communication unit 15, and generates image data in a bitmap format. In the image data, each pixel has pixel values of four colors, i.e., cyan (C), magenta (M), yellow (Y), and black (K). The pixel value is a data value representing the density of the image, and for example, the data value of eight bits represents the density of 0 to 255 gradations. Hereinafter, assuming that the minimum value in a range of the pixel value be 0% and the maximum value be 100%, the pixel value may be represented by 0 to 100%. For example, in the case of 0 to 255 gradations, the pixel value of zero gradation is expressed as 0%, the pixel value of 128 gradation is expressed as 50%, and the pixel value of 255 gradation is expressed as 100%, in some cases.

The image generator 16 can generate attribute data indicating an attribute of each pixel of the image data. For example, at the time of the rasterizing processing, the image generator 16 can determine the attribute of each pixel of an image such as kana, an alphabet, a numeral, and the like drawn according to the description of a character code in the PDL data as a Text. Furthermore, the image generator 16 determines an attribute of each pixel of an image such as a polygon, a circle, a ruled line, and the like drawn according to the description in a vector format such as DXF, SVG, WMF, as Graphics. The image generator 16 can determine an attribute of each pixel of an image such as a photographic image drawn in a JPEG format file as an Image or a Picture.

The image memory 17 is a buffer memory which temporarily holds the image data compressed by the controller 11 in accordance with a timing of image formation. As the image memory 17, a dynamic RAM (DRAM) and the like can be used.

The image processing apparatus G reads the compressed image data from the image memory 17 and applies various image processing such as decompression processing, sweeping correction processing, edge processing, and halftone processing.

The image forming unit 18 is also referred to as an engine and forms an image drawn by four colors on a paper sheet according to the pixel values of four colors including C, M, Y, and K of each pixel of the image data to which the image processing has been applied by the image processing apparatus G.

Figure 2:
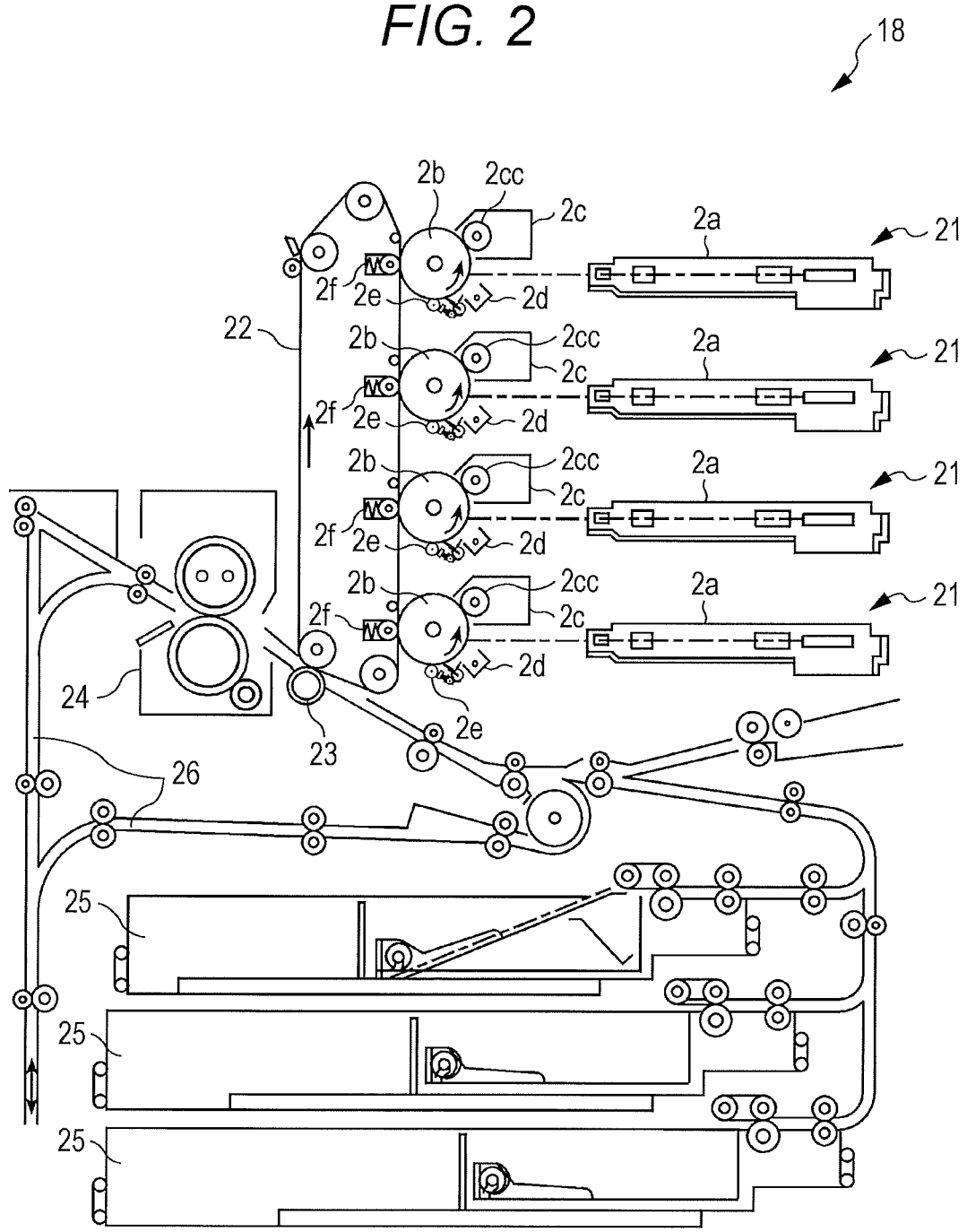
FIG. 2 is a front view of an exemplary configuration of an electrophotographic image forming unit.

In FIG. 2, an exemplary configuration of the electrophotographic image forming unit 18 is illustrated.

As illustrated in FIG. 2, the image forming unit 18 includes four writing units 21, an intermediate transfer belt 22, a secondary transfer roller 23, a fixing device 24, a paper feed tray 25, and the like.

The four writing units 21 are arranged in tandem along a belt surface of the intermediate transfer belt 22 and forms images with the colors of C, M, Y, and K. Although the colors of the images formed by the writing units 21 are different from each other, the writing units 21 have the same structure. As illustrated in FIG. 2, the writing unit 21 includes an exposure unit 2a, a photoreceptor 2b, a development unit 2c, a charging unit 2d, a cleaning unit 2e, and a primary transfer roller 2f.

At the time of the image formation, in each writing unit 21, after the charging unit 2d has charged the photoreceptor 2b, the rotating photoreceptor 2b is exposed and scanned with a luminous flux emitted from the exposure unit 2a based on the image data, and an electrostatic latent image is formed. The development unit 2c includes a development sleeve 2cc, and the development sleeve 2cc supplies a toner onto the photoreceptor 2b to develop the electrostatic latent image on the photoreceptor 2b. In this way, the images formed on the photoreceptors 2b of the four writing units 21 are sequentially superimposed and transferred (primary transfer) onto the intermediate transfer belt 22 by the respective primary transfer rollers 2f. With the first transfer, an image composed of the colors is formed on the intermediate transfer belt 22. After the primary transfer, the toner remaining on the photoreceptor 2b is removed by the cleaning unit 2e.

After feeding a sheet paper from the paper feed tray 25 and transferring the image (secondary transfer) from the intermediate transfer belt 22 onto the paper sheet by the secondary transfer roller 23, the image forming unit 18 performs fixing processing by heating and pressurizing the paper sheet by the fixing device 24. In a case where the images are formed on both sides of the paper sheet, after the paper sheet has been conveyed to a conveyance path 26 and turned over, the paper sheet is conveyed to the secondary transfer roller 23 again.

In the image forming apparatus 10, as receiving the PDL data by the communication unit 15, the image generator 16 applies the rasterizing processing to the PDL data and generates the image data. The controller 11 compresses the image data in block units and stores the image data in the storage unit 12. Then, the controller 11 transfers the compressed image data from the storage unit 12 to the image memory 17 in accordance with the timing of the image formation.

As a method of compressing (decompressing) the image data, if a method by using the maximum value and the minimum value of the pixel value of each block when each pixel of the image data is divided is used, for example, block truncation coding (BTC) compression, reductive compression, and 3 Dc can be used. The reductive compression is one type of the BTC compression that combines resolution conversions, and methods disclosed in JP 4424404 B, JP 5029560 B and the like can be used.

An example is described below in which image data having a resolution of 600 dpi and a pixel value of eight bits per pixel is divided in units of blocks of 4×4 pixels with the BTC compression and the image data is compressed to image data having a resolution of 600 dpi and a pixel value of four bits per pixel.

Figure 3:
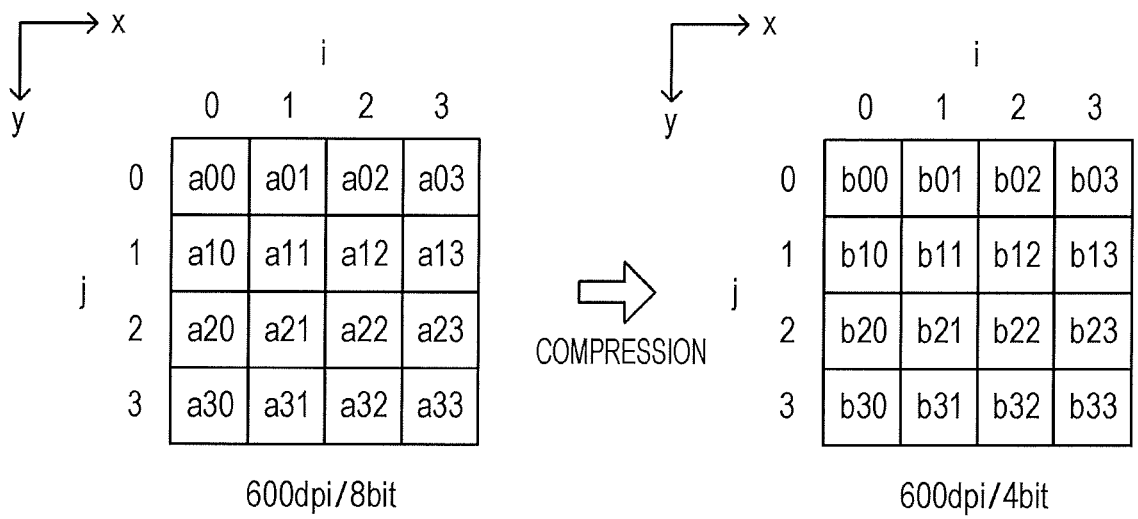
FIG. 3 is a diagram of an example of blocks before and after compression.

In FIG. 3, blocks of 4×4 pixels before and after the compression are illustrated.

As illustrated in FIG. 3, the block before the compression includes 16 pixels respectively having eight-bit pixel values aij (a00 to a33). The compressed block has the resolution which is not different from that before the compression and includes 16 pixels. However, the pixel values of the pixels are respectively converted into four-bit pixel values bij (b00 to b33). Note that i represents a position of each pixel in the block in a main scanning direction x, and j represents a position in a sub-scanning direction y.

The controller 11 determines the maximum value Max and the minimum value min of pixel values in each of the divided blocks and calculates seven thresholds TH1 to TH7 which divide the range from the determined minimum value min to maximum value Max into eight parts as indicated by the following formulas.

$$TH1=\min+(\text{Max}-\min)\times 1/14$$

$$TH2=\min+(\text{Max}-\min)\times 3/14$$

$$TH3=\min+(\text{Max}-\min)\times 5/14$$

$$TH4=\min+(\text{Max}-\min)\times 7/14$$

$$TH5=\min+(\text{Max}-\min)\times 9/14$$

$$TH6=\min+(\text{Max}-\min)\times 11/14$$

$$TH7=\min+(\text{Max}-\min)\times 13/14$$

Based on the calculated thresholds TH1 to TH7, the controller 11 converts each pixel value aij in the block into the three-bit pixel value bij as indicated by the following formulas.

$$\text{When } \min \leq aij < TH1, bij=000$$

$$\text{When } TH1 \leq aij < TH2, bij=001$$

$$\text{When } TH2 \leq aij < TH3, bij=010$$

$$\text{When } TH3 \leq aij < TH4, bij=011$$

$$\text{When } TH4 \leq aij < TH5, bij=100$$

$$\text{When } TH5 \leq aij < TH6, bij=101$$

$$\text{When } TH6 \leq aij < TH7, bij=110$$

$$\text{When } TH7 \leq aij < \text{Max}, bij=111$$

The controller 11 adds one-bit maximum value Max and one-bit minimum value min of eight bits as the lowermost bit of the three-bit pixel value bij of each pixel in the block, and outputs the obtained four-bit pixel value bij as the compressed image data.

Figure 4:
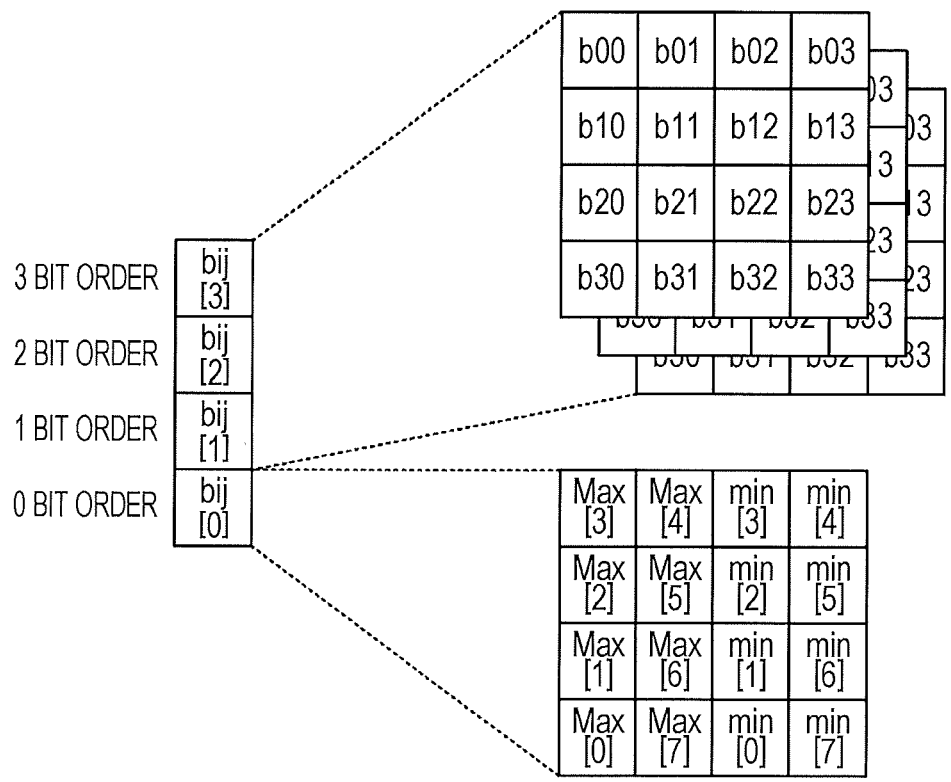
FIG. 4 is a diagram of a data structure of compressed image data.

In FIG. 4, the data structure of the compressed block of 4×4 pixels is illustrated.

As illustrated in FIG. 4, when the image data of the compressed block is expressed as planes bij[0] to [3], each of the upper planes bij[1] to [3] holds the three-bit pixel value bij obtained by converting the pixel value aij of each pixel. The plane is a data layer including 4×4 pixels at each of bit orders of zero to three. In addition, the lowest plane bij [0] holds one-bit maximum value Max and one-bit minimum value min of eight bits. In FIG. 4, each of Max[0] to Max[7] and min[0] to min[7] represents one bit of each of the bit orders zero to seven between the maximum value Max and the minimum value min of eight bits.

Although the example of 4/8 compression for compressing eight bits into four bits has been described above, a compression ratio can be arbitrarily set. For example, the eight-bit pixel value aij is converted into the two-bit pixel value bij by using the thresholds TH1 to TH3 which divide a range from the minimum value min to the maximum value Max into four equal parts, and one-bit maximum value Max and one-bit minimum value min of eight bits are added to the lowermost bit. In this way, 3/8 compression for compressing eight bits into three bits can be performed.

[Image Processing Apparatus]

In the image processing apparatus G, the compressed image data is input from the image memory 17, and a sweeping correction value is calculated from the compressed image data. In addition, it is possible to decompress the compressed image data and apply image processing. Furthermore, in the image processing apparatus G, the sweeping correction is applied to the decompressed and image-processed image data by using the calculated sweeping correction value, and the halftone processing and the like is further applied to the obtained image data. Then, the image data is output to the image forming unit 18.

Figure 5:
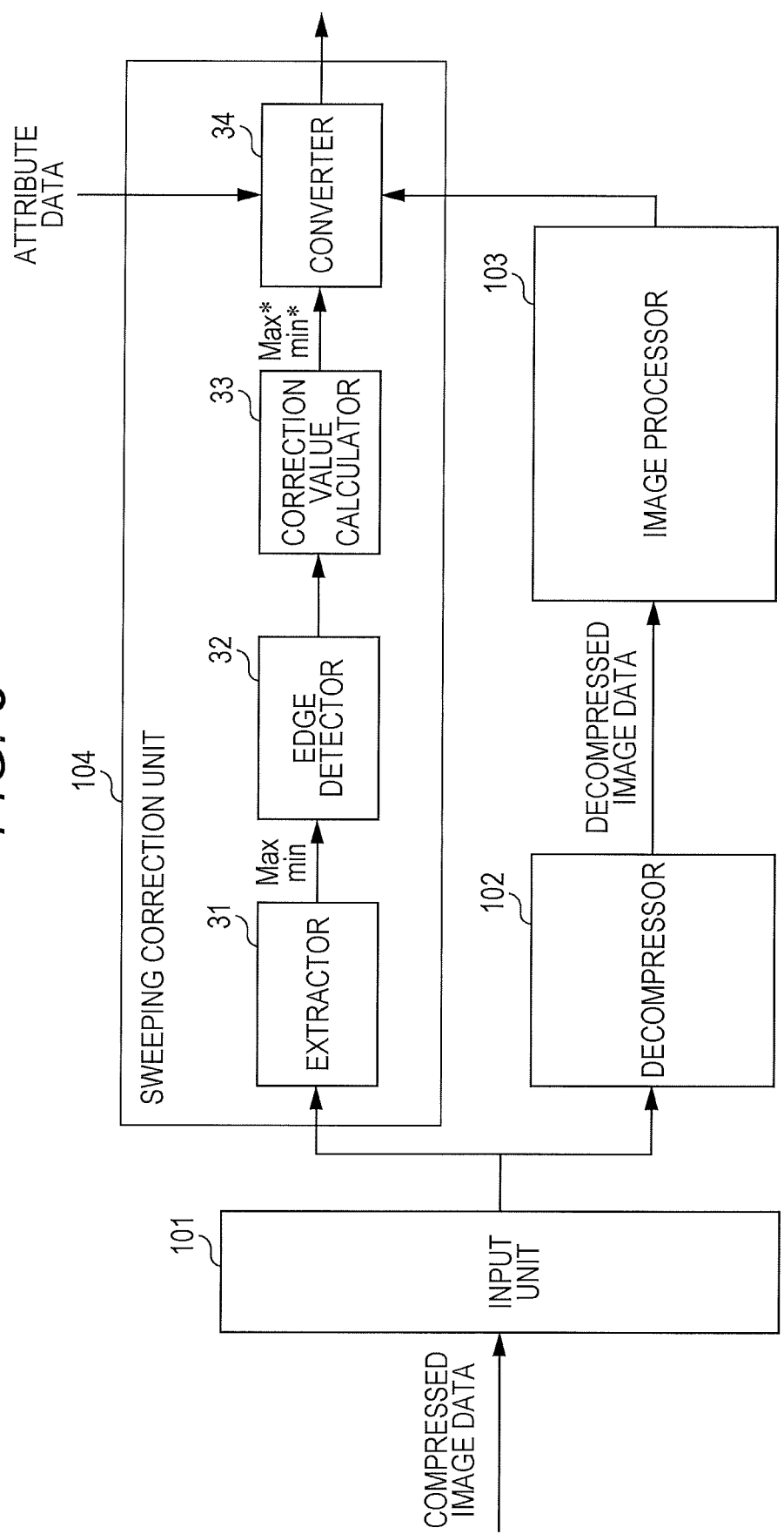
FIG. 5 is a block diagram of a configuration of an image processing apparatus according to an embodiment of the present invention for each function.

In FIG. 5, each function of configurations for the sweeping correction processing and the image processing which are applied in parallel in the image processing apparatus G is illustrated.

As illustrated in FIG. 5, the image processing apparatus G includes an input unit 101, a decompressor 102, an image processor 103, and a sweeping correction unit 104.

A processing content of each unit of the image processing apparatus G can be realized by hardware processing with an image processing circuit such as an application specific integrated circuit (ASIC) and a field-programmable gate array (FPGA).

The input unit 101 inputs the compressed image data from the image memory 17 in units of a plurality of blocks. The input unit 101 can include line memories for a plurality of lines and the like. It is preferable that the number of lines of the line memories be determined as the number of lines necessary for the sweeping correction and the image processing. For example, in a case where a sweeping correction range is four blocks from an edge, it is preferable to include a line memory which can hold compressed image data of 16 lines.

The decompressor 102 decompresses the compressed image data by using the maximum value Max and the minimum value min of each block of the compressed image data which has been input by the input unit 101. In a case of the BTC compression, the decompressor 102 extracts Max[0] to Max[7] and min[0] to min[7] held in the plane bij [0] and obtains the maximum value Max and the minimum value min of the eight bits.

By using the obtained maximum value Max and minimum value min of the eight bits, the decompressor 102 converts the three-bit pixel values bij held in the planes bij[1] to bij[3] into eight-bit pixel values a*ij as indicated by the following formulas and outputs the pixel values as the decompressed image data.

When $bij=000, a*ij=\min+(\text{Max}-\min)\times 0/14$

When $bij=001, a*ij=\min+(\text{Max}-\min)\times 2/14$

When $bij=010, a*ij=\min+(\text{Max}-\min)\times 4/14$

When $bij=011, a*ij=\min+(\text{Max}-\min)\times 6/14$

When $bij=100, a*ij=\min+(\text{Max}-\min)\times 8/14$

When $bij=101, a*ij=\min+(\text{Max}-\min)\times 10/14$

When $bij=110, a*ij=\min+(\text{Max}-\min)\times 12/14$

When $bij=111, a*ij=\min+(\text{Max}-\min)\times 14/14$

The image processor 103 applies various image processing to the image data decompressed by the decompressor 102 as necessary. As the image processing which can be applied, for example, edge processing such as smoothing (anti-aliasing) processing, contour emphasis processing of emphasizing a contour of an object such as a character, and thinning processing of narrowing the line width can be exemplified.

The sweeping correction unit 104 applies the sweeping correction to eliminate a density fluctuation caused by the toner sweeping.

As illustrated in FIG. 5, the sweeping correction unit 104 includes an extractor 31, an edge detector 32, a correction value calculator 33, and a converter 34.

[Extraction]

The extractor 31 extracts the maximum value Max and the minimum value min from each block of the compressed image data input by the input unit 101. In a case of the 4/8 compression, the extractor 31 extracts Max[7] to Max[0] and min[7] to min[0] from the plane bij[0] of the lowermost bit and obtains the maximum value Max and the minimum value min of the eight bits.

[Edge detection]

The edge detector 32 detects an edge of the object by using at least one of the maximum value Max and the minimum value min of each block extracted by the extractor 31. The object is an image to be formed by the toner such as characters and figures.

When the toner sweeping occurs, a density fluctuation occurs on the front end side or the rear end side of the object in a shift direction of the image formed onto the photoreceptor 2b with the toner by the image forming unit 18 (rotation direction of photoreceptor 2b, that is, sub-scanning direction y and direction same as conveyance direction of paper sheet on which image has been formed). Therefore, in a case where edge correction to eliminate the density fluctuation caused by the toner sweeping is applied, the edge detector 32 detects the edge at the front end or the rear end of the object in the shift direction of the image.

Specifically, the edge detector 32 compares the maximum value Max of each block with the maximum value Max of the block which is positioned d blocks ahead or behind from the block in the shift direction of the image.

Figure 6:
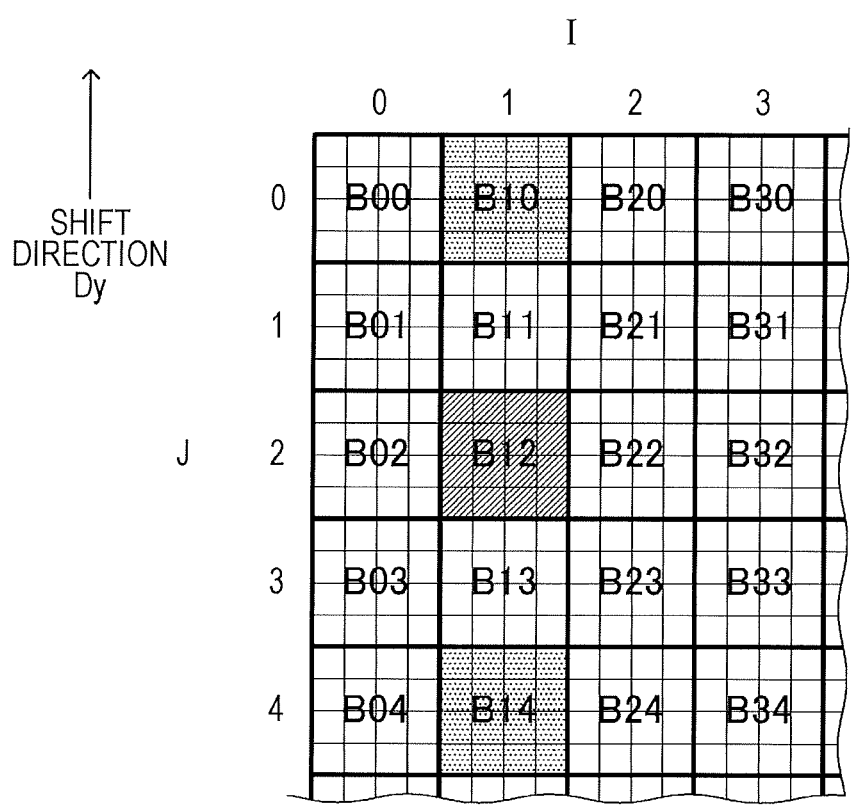
FIG. 6 is a diagram of blocks of the compressed image data.

In FIG. 6, blocks BIJ in the image data are illustrated. In FIG. 6, I represents the position of each block in the main scanning direction x, and J represents the position in the sub-scanning direction y.

For example, as illustrated in FIG. 6, in a case where a block B12 is a target block, the edge detector 32 compares the maximum value Max of the target block B12 with the maximum value Max of a block B10 positioned two blocks ahead in the shift direction Dy of the image or the maximum value Max of a block B14 positioned two blocks behind.

In a case where the maximum values Max of the target block and the block positioned d blocks ahead which have been compared with each other satisfy the following formula (11), the edge detector 32 detects the edge at the front end of the object. Furthermore, in a case where the maximum values Max of the target block and the block positioned d blocks behind which have been compared with each other satisfy the following formula (12), edge detector 32 detects the edge at the rear end of the object. In both cases, the target block contains contour pixels of the object.

$$\text{Max}(I,J)-\text{Max}(I,J-d)>Th \quad (11)$$

$$\text{Max}(I,J)-\text{Max}(I,J+d)>Th \quad (12)$$

[In the formulas (11) and (12), Max (I, J) represents the maximum value Max of the target block BIJ. Max (I, J−d) represents the maximum value Max of a block BI (J−d) which is positioned d blocks ahead of the target block BIJ, and Max (I, J+d) represents the maximum value Max of a block BI (J+d) which is positioned d blocks behind the target block BIJ. Th represents a threshold for edge detection.]

Figure 7:
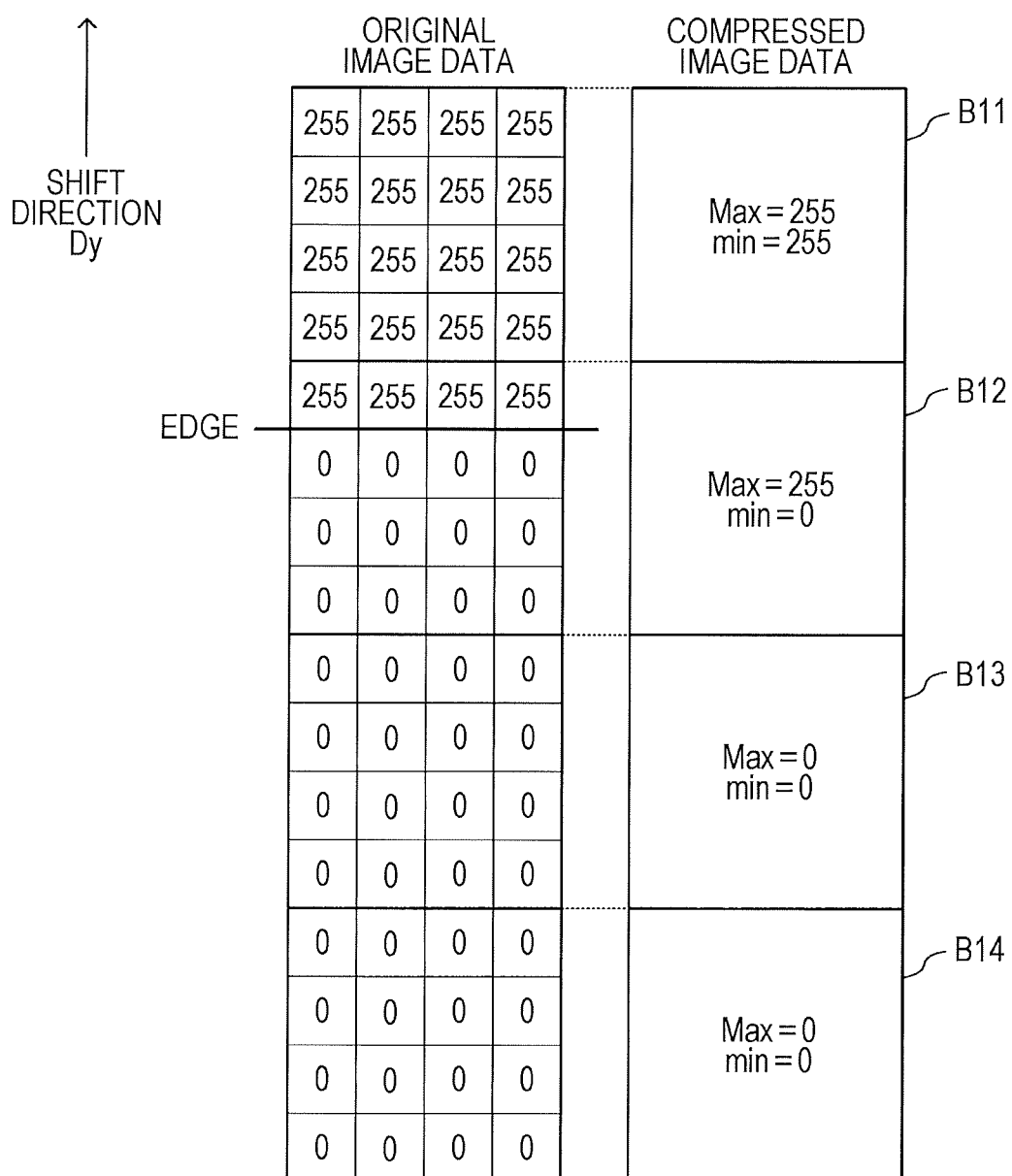
FIG. 7 is a diagram of an example of original image data and compressed image data.

In FIG. 7, original image data and the compressed image data are illustrated.

As illustrated in FIG. 7, a block B11 is a part of the object, and an original pixel value of each pixel is 255. Each of the maximum value Max and the minimum value min of the compressed block B11 is 255. The block B12 includes the edge at the rear end of the object, and pixels having the original pixel value of 255 and pixels having the original pixel value of zero are mixed. The maximum value Max of the compressed block B12 is 255, and the minimum value min is zero. Blocks B13 and B14 are background of the object, and an original pixel value of each pixel is zero. Therefore, the maximum values Max and the minimum values min of the compressed blocks B13 and B14 are all zero.

In a case where the block B12 is the target block, since the maximum values Max of the blocks B12 and B14 satisfy the above formula (12), the edge detector 32 detects the edge at the rear end in the block B12.

Even in a case where the above formula (11) or (12) is satisfied, when the number of blocks from the previous edge detection is equal to or less than a fixed value, it is preferable that the edge detector 32 invalidates the edge detection. Thus, it is possible to prevent an erroneous detection of the edge when a monotonous increase or a monotonous decrease of the pixel value continues.

Note that if the edge can be detected by using at least one of the maximum value Max and the minimum value min, other edge detection method can be used.

For example, the maximum values Max and the minimum values min of the target block and a block adjacent to the target block are compared with each other. When the maximum value Max of the target block≥the maximum value Max of the adjacent block and the minimum value min of the target block−the minimum value min of the adjacent block>Th are satisfied, the edge may be detected.

[Correction Value Calculation]

The correction value calculator 33 increases or decreases the maximum value Max, or the maximum value Max and the minimum value min of each block within the correction range from the edge detected by the edge detector 32 according to the distance from the edge so as to calculate a maximum value Max* and a minimum value min* after correction. The correction value calculator 33 outputs the maximum value Max and the minimum value min before the correction and the maximum value Max* and minimum value min* after the correction to the converter 34.

In a case where the toner sweeping occurs, a density fluctuation occurs at the front end and the rear end of the object.

Figure 8:
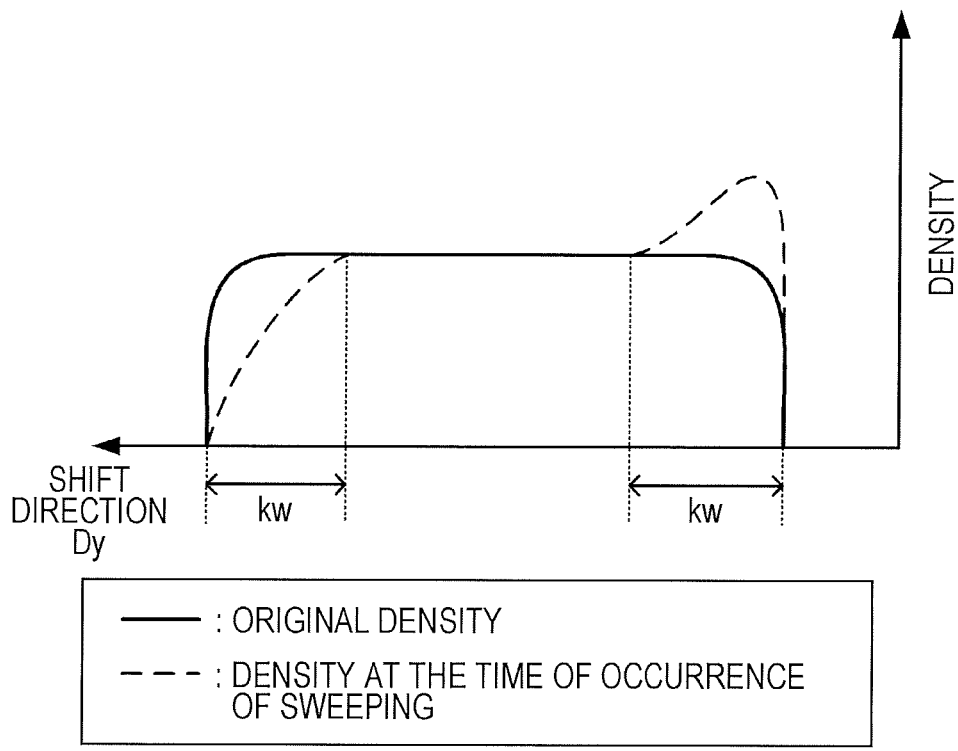
FIG. 8 is a diagram of an example of a density fluctuation caused by toner sweeping.

In FIG. 8, an example of the density fluctuation in a case where the development system is a counter system in which the rotation direction of the photoreceptor 2b is reverse to that of the development sleeve 2cc is illustrated.

As illustrated in FIG. 8, at the front end of the object, as the position is closer to the edge at the front end of the object, the density is largely decreased. The decrease in the density on the front end side is referred to as a blur. Furthermore, at the rear end of the object, as the position is closer to the edge at the rear end, the density largely increases. In a case where the correction of the density fluctuation is applied, to reproduce the original density, as it is assumed that a range from the edge at the front end or the rear end where the density fluctuation occurs be set as a correction range kw (unit: block), the correction value calculator 33 increases or decreases the maximum value Max and the minimum value min of each block in the object positioned within the correction range kw according to the distance from the edge.

Specifically, when detecting the edge at the front end by the edge detector 32, the correction value calculator 33 calculates the maximum value Max* and the minimum value min* after the correction based on the following formula (21).

Furthermore, when detecting the edge at the rear end by the edge detector 32, the correction value calculator 33 calculates the maximum value Max* and the minimum value min* after the correction based on the following formula (22).

$$E^*(c)=E(c)+\max\{0,kh\times(1-c/kw)\} \quad (21)$$

$$E^*(c)=E(c)-\max\{0,kh\times(1-c/kw)\} \quad (22)$$

In the formulas (21) and (22), E*(c) represents the maximum value Max* or the minimum value min* after the correction of the block having a distance c (number of blocks) from the edge of the blocks within the correction range kw. E(c) represents the maximum value Max or the minimum value min before the correction of the block having the same number of blocks c. A reference max {A, B} represents a function of selecting and outputting the larger one of A and B. A reference kh represents a correction coefficient of adjusting a correction amount according to the distance from the edge.

Note that (i) in a case where the maximum value Max before the correction is equal to or less than a first threshold Tha or (ii) in a case where a difference between the maximum value Max and the minimum value min before the correction is equal to or less than a second threshold Thb although the maximum value Max before the correction exceeds the first threshold Tha, it is preferable that the correction value calculator 33 correct only the maximum value Max and output the minimum value min before the correction as the minimum value min* after the correction. Furthermore, (iii) in a case where the maximum value Max before the correction exceeds the first threshold Tha and the difference between the maximum value Max before the correction and the minimum value min before the correction exceeds the second threshold Thb, it is preferable that the correction value calculator 33 correct both the maximum value Max and the minimum value min.

Figure 9:
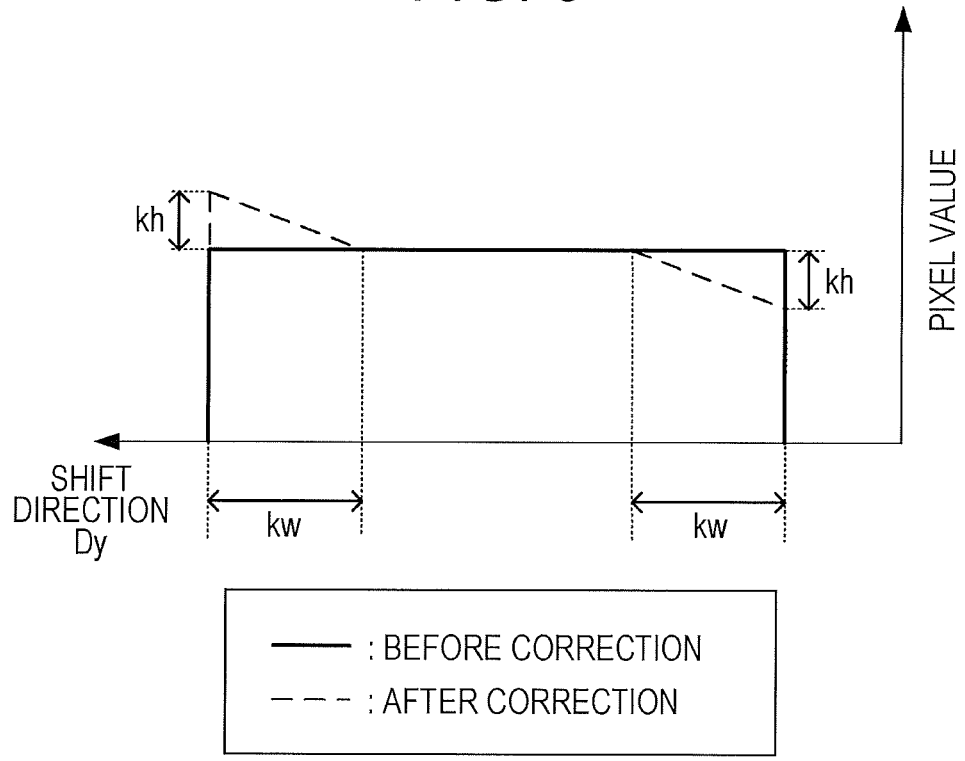
FIG. 9 is a diagram of an example of correction of image data.

In FIG. 9, an example of correction of the image data is illustrated.

By applying the sweeping correction by using the corrected maximum value Max* and minimum value min* calculated as described above, as illustrated in FIG. 9, the pixel value of each block in the object positioned within the correction range kw from the edge at the front end of the object can be largely increased as the position is closer to the edge at the front end. Furthermore, the pixel value of each block in the object positioned within the correction range kw from the edge at the rear end of the object can be largely decreased as the position is closer to the edge at the rear end. As a result, even if the density fluctuation caused by the toner sweeping occurs, the original density illustrated in FIG. 8 can be reproduced.

The correction range kw and the correction coefficient kh can be arbitrarily set. For example, it is possible to set the range, where the density fluctuation occurs, which is confirmed by actually forming the image to the correction range kw. Similarly, by confirming a relation between the distance from the edge and the amount of the density fluctuation, the correction coefficient kh proportional to the distance from the edge can be set according to the relation.

The density fluctuation is small regarding an object of which the density is close to the maximum or minimum density even if the toner is swept. However, a density fluctuation of an object having an intermediate density is large, and the density fluctuation is likely to be conspicuous as a deterioration in an image quality. Therefore, an adjustment coefficient is determined so that the correction amount becomes smaller in a density range in which the density fluctuation caused by the sweeping is small and the correction amount becomes larger in a density range in which the density fluctuation is large. It is preferable to use the correction coefficient kh which is obtained by multiplying the adjustment coefficient for the calculation in the formulas (21) and (22) described above. Accordingly, correction accuracy can be improved.

Similarly, the shorter the width of the object is, the less conspicuous the density fluctuation caused by the sweeping is. Therefore, the adjustment coefficient is determined so that the correction amount becomes smaller as the width is shorter, and it is preferable to use the correction coefficient kh obtained by multiplying the adjustment coefficient for the calculation in the formulas (21) and (22) described above. Accordingly, the correction accuracy can be improved. As the width of the object, it is preferable to obtain the number of blocks from the edge at the front end of the object to the edge at the rear end.

In a case where the development system is a with system in which the rotation direction of the photoreceptor $2b$ is the same as the rotation direction of the development sleeve $2cc$, a phenomenon reverse to that in the counter system occurs. Therefore, it is preferable to apply reverse correction, that is, correction of the maximum value Max and the minimum value min so as to decrease the pixel value of the front end portion and increase the pixel value of the rear end portion.

[Conversion]

The converter 34 determines a conversion formula of a pixel value by using the maximum value Max and the minimum value min before the correction and the maximum value Max* and the minimum value min* after the correction output from the correction value calculator 33 and converts each pixel value of the image data which is obtained by decompressing the compressed image data by the decompressor 102 according to the determined conversion method so as to apply the sweeping correction. In a case where the edge correction and the like are applied in parallel to the sweeping correction, the image data to be converted is image data which is image-processed by the image processor 103 after decompressed by the decompressor 102.

It is preferable that the converter 34 determine a conversion formula different in each of cases including (i) when the maximum value Max before the correction is equal to or less than the first threshold Tha and is close to the minimum value 0% in a range of the pixel value, (ii) the difference between the maximum value Max and the minimum value min before the correction is equal to or less than the second threshold Thb and the maximum value Max and the minimum value min before the correction are substantially the same although the maximum value Max before the correction exceeds the first threshold Tha, and (iii) a case other than the above, that is, when the maximum value Max before the correction exceeds the first threshold Tha and the difference between the maximum value Max and the minimum value min before the correction exceeds the second threshold Thb, so that the minimum value of each block is equal to or less than the maximum value. As a result, it is possible to maintain the relation such that the minimum value is equal to or less than the maximum value in each block, and the deterioration in the image quality caused by the conversion can be prevented.

The first threshold Tha is a threshold to determine whether the maximum value Max is close to the minimum value 0% of the pixel value, and the second threshold Thb is a threshold to determine whether the maximum value Max and the minimum value min before the correction are substantially the same. The first threshold Tha and the second threshold Thb can be arbitrarily set by experimentally obtaining an appropriate numerical value and the like.

In a case of (i), it is preferable that the converter 34 determine to use the conversion formula indicated by the following formula (1).

$$Cout = Cin \qquad (1)$$

[In the formula (1), Cin represents a pixel value before conversion, and Cout represents a pixel value after conversion.]

Figure 10:
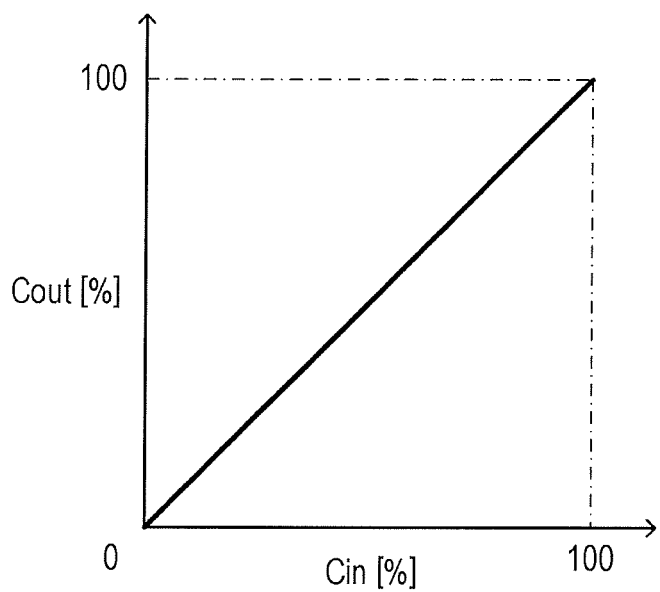
FIG. 10 is a diagram of an exemplary conversion formula.

In FIG. 10, an exemplary conversion formula in a case of (i) is illustrated.

As illustrated in FIG. 10, the conversion formula is a linear function with an inclination of one and an intercept of zero, and the input pixel value can be directly output.

A block in which the maximum value Max before the correction is close to the minimum value of 0% in the range of the pixel value is a non-image portion (base portion of paper sheet), and correction is unnecessary. Therefore, by determining the conversion formula as described above, the above block can be excluded from the correction.

In a case of (ii), it is preferable that the converter 34 determine to use the conversion formula indicated by the following formula (2).

$$Cout = Cin \times Max^* / Max \qquad (2)$$

[In the formula (2), Cin represents a pixel value before conversion, and Cout represents a pixel value after conversion. Max represents the maximum value before correction, and Max* represents the maximum value after correction.]

Figure 11:
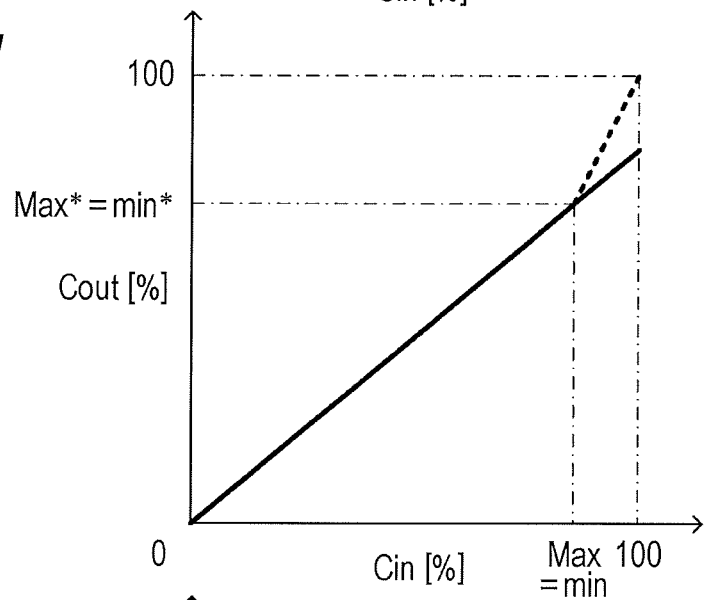
FIG. 11 is a diagram of an exemplary conversion formula.

In FIG. 11, an exemplary conversion formula in the case of (ii) is illustrated.

As illustrated in FIG. 11, in a case of Max=min, a conversion formula indicated by a solid line having an inclination of Max*/Max can be used.

In a range from Max to 100% beyond the range of min to Max, a conversion formula indicated by a dotted line, that is, a linear function connecting two points of (Max, Max*) and (100, 100) may be used. As a result, the pixel value between Max and 100% before the correction can be converted into the pixel value between Max* and 100% after the correction, and any input value can be converted.

When Max≈min is satisfied, the conversion formula using the maximum values Max and Max* and the minimum values min and min* may have an extremely large inclination. However, by determining the conversion formula as described above, in an image portion where the maximum value Max and the minimum value min before the correction are substantially the same, inversion of the magnitude relation of the maximum value Max* and the minimum value min* after the conversion can be prevented, and occurrence of the tone jump and the like can be prevented. Accordingly, the conversion can be stably performed.

In a case of (iii), it is preferable that the converter 34 determine to use the conversion formula indicated by the following formula (3).

$$Cout=(Cin-min^*)\times\{(Max^*-min^*)/(Max-min)\}+min^* \qquad (3)$$

[In the formula (3), Cin represents a pixel value before the conversion, and Cout represents a pixel value after the conversion. Max represents the maximum value before the correction, and Max* represents the maximum value after the correction. The reference min represents the minimum value before the correction, and the reference min* represents the minimum value after the correction.]

Figure 12:
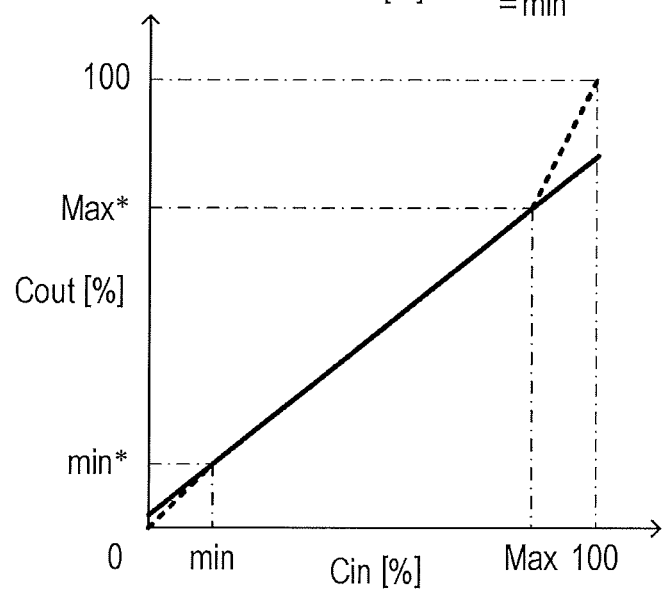
FIG. 12 is a diagram of an exemplary conversion formula.

In FIG. 12, an exemplary conversion formula in a case of (iii) is illustrated.

As illustrated in FIG. 12, a conversion formula indicated by a solid line with an inclination of $\{(Max^*-min^*)/(Max-min)\}$ can be used.

In a range from Max to 100% beyond the range of min to Max, the conversion formula indicated by the dotted line in FIG. 12, that is, a linear function connecting two points of (Max, Max*) and (100, 100) may be used. As a result, the pixel value between Max and 100% before the correction can be converted into the pixel value between Max* and 100% after the correction, and any input value can be converted.

Similarly, in the range of zero to min %, the conversion formula indicated by the dotted line in FIG. 12, that is, a linear function connecting two points of (min, min*) and (0, 0) may be used. As a result, the pixel value between zero and min % before the correction can be converted into the pixel value between zero and min* after the correction, and any input value can be converted.

By determining the conversion formula as described above, the pixel values which have been originally positioned within the range of min to Max before the correction are converted so as to linearly correspond to pixel values within the range of min* to Max* after the correction, and the pixel value out of the range of min to Max before the correction is converted with the same relation as the pixel value within the range. A magnitude relation between the maximum value Max* and the minimum value min* can be maintained, and the density is continuously changed after the sweeping correction. Even in the image data which has been image processed after the decompression processing, an effect of the sweeping correction can be obtained without causing a deterioration in the image quality such as a tone jump.

FIG. 13 is a diagram of the maximum value Max* and the minimum value min after the correction of the compressed image data illustrated in FIG. 7, image data which has been image-processed after the decompression, and image data to which the sweeping correction has been applied by converting the image data.

As illustrated in FIGS. 7 and 13, in the image data which has been image-processed after the decompression, the pixel values, which have been originally 255, are decreased to 180. On the other hand, due to the sweeping correction, in the block B11, both the maximum value Max and the minimum value min are decreased from 255 to 220. In the block B12 including the edge, the maximum value Max is decreased from 255 to 200, a decrease amount is larger than that in the block B11.

Since the block B11 corresponds to the case (ii), each pixel value in the block B11 of the image data which has been image-processed after the decompression is converted according to the conversion formula expressed by the formula (2). Since the block B12 corresponds to the case (iii), each pixel value in the block B12 is converted according to the conversion formula expressed by the formula (3). As a result, in the block B11, the pixel value of each pixel, which has been originally 255, is converted into 155, and in the block B12, the pixel which has originally had the pixel value of 255 is converted into 141. The closer to the edge at the rear end the position is, the larger the decrease in the pixel value of the obtained image data is.

It is preferable that the converter 34 input attribute data indicating an attribute of each pixel of the image data and switch whether to perform conversion (sweeping correction) according to the attribute indicated by the attribute data for each block.

For example, by switching to apply the correction to the block having the attribute of characters and figures and not to apply the correction to the block having the attribute of photographs, the block having the attribute of photographs can be excluded from the correction target. In the image region of the photograph, since low-pass filter processing or the like is applied to remove noise, a contrast difference between the object and the background is not clear, and it may be difficult to detect the contact difference as an edge. In addition, a region where the density of the object is even is small, the density fluctuation caused by the toner sweeping is originally not conspicuous, and the effect of the correction is small. Whereas, the correction may cause an unintended density fluctuation. Therefore, the pixel with the attribute of the photograph is excluded from the correction target so that a new deterioration in the image quality can be prevented.

At the time of switching, the converter 34 converts the attribute in pixel units into an attribute in block units. For example, when at least a single pixel having the attribute of the character is included in the block, the converter 34 converts the attribute of the block into the character, and when the pixel having the attribute of the character is not included and at least a single pixel having the attribute of the figure is included, the converter 34 converts the attribute of the block into the figure. When the pixel having the attributes of the character and the figure is not included and a pixel having the attribute of the photograph is included, the attribute of the block can be converted into the photograph.

Figure 14:
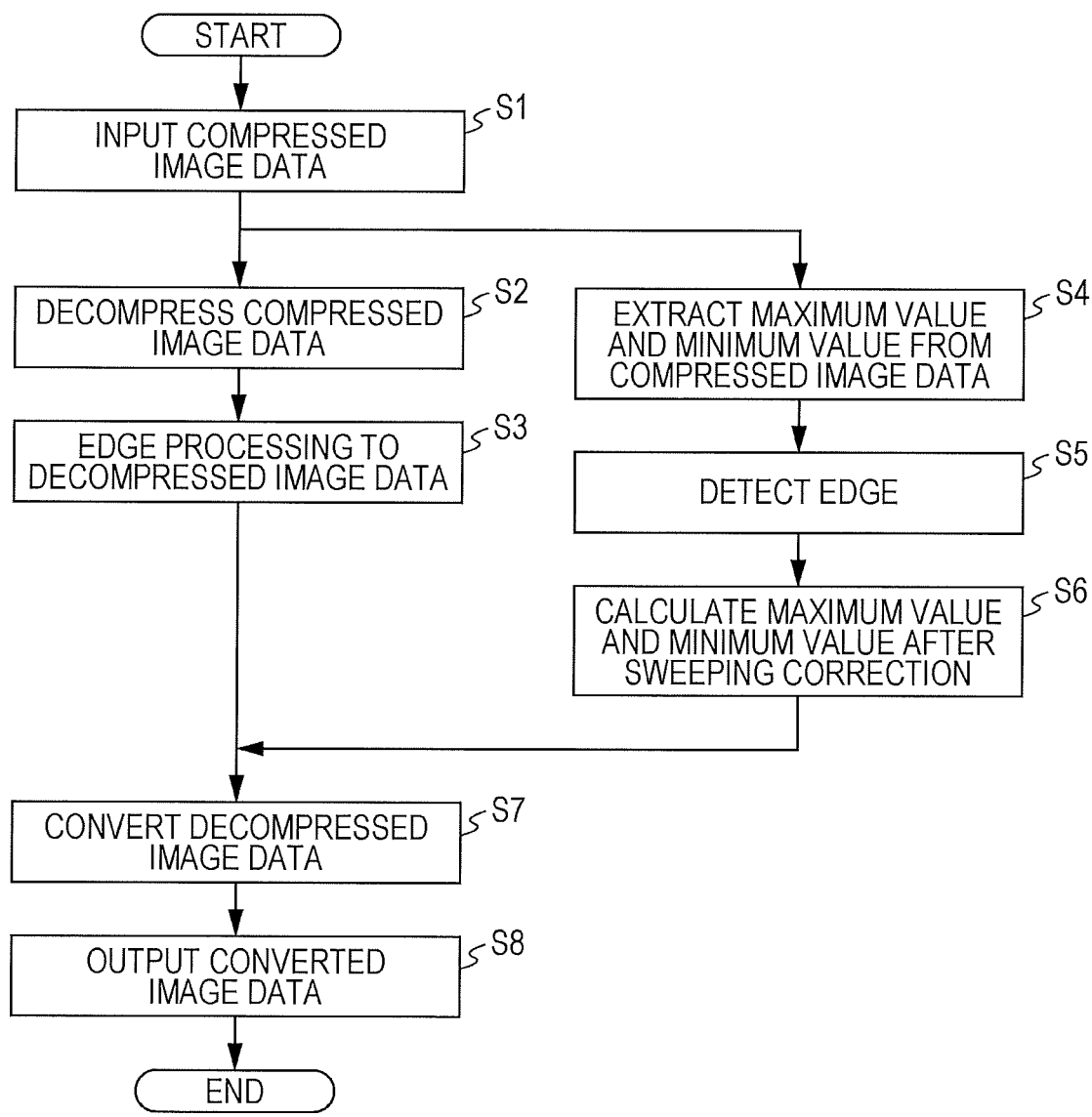
FIG. 14 is a flowchart of a processing procedure of the image processing apparatus.

In FIG. 14, a processing procedure of the image processing apparatus G described above is illustrated.

As illustrated in FIG. 14, in the image processing apparatus G, the input unit 101 inputs the compressed image data (step S1), and the decompressor 102 decompresses the compressed image data (step S2). The image processor 103 applies the image processing, for example, edge processing to the decompressed image data (step S3).

In parallel to the decompression and the edge processing, in the sweeping correction unit 104, the extractor 31 extracts the maximum value Max and the minimum value min of each block from the compressed image data (step S4). The edge detector 32 detects the edge by using the extracted maximum value Max and minimum value min (step S5), the correction value calculator 33 calculates the maximum value Max* and the minimum value min* after the sweeping correction according to the number of blocks from the detected edge (step S6).

The converter 34 determines the conversion formula based on the maximum value Max and the minimum value min before the correction and the maximum value Max* and the minimum value min* after the correction. Then, each pixel value of the image data which has been decompressed by the decompressor 102 and the image-processed by the image processor 103 is converted by the converter 34 according to the determined conversion formula (step S7), and the converter 34 outputs the converted image data (step S8). Accordingly, the image data can be obtained to which the edge processing and the sweeping correction have been applied. The image processing apparatus G further applies the halftone processing and the like to the image data, and then outputs the image data to the image forming unit 18.

As described above, the image processing apparatus G according to the present embodiment includes the extractor 31 which divides each pixel in block units and extracts the maximum value Max and the minimum value min of each block from the image data compressed by using the maximum value Max and the minimum value min of the pixel value of each block, the edge detector 32 which detects the edge at the front end or the rear end of the image by using the maximum value Max and the minimum value min of each block extracted by the extractor 31, the correction value calculator 33 which corrects the maximum value Max, or the maximum value Max and the minimum value min of each block positioned in a certain range from the front end or the rear end of the image (object) according to the distance from the edge detected by the edge detector 32 and calculates the maximum value Max* and the minimum value min* after the correction, and the converter 34 which determines the conversion formula of the pixel value by using the maximum value Max and the minimum value min before the correction of each block and the maximum value Max* and the minimum value min* after the correction calculated by the correction value calculator 33 and converts each pixel value of each image data which is obtained by decompressing the compressed data according to the determined conversion formula to apply sweeping correction.

As a result, the sweeping correction value, that is, the maximum value Max* and the minimum value min* after the correction, are calculated from the compressed image data, and the sweeping correction can be applied to the decompressed image data by using the correction value. The image processing such as the edge processing can be effectively applied to the decompressed image data in parallel to the sweeping correction processing, and the line memory and the like can be shared. Therefore, an increase in the circuit size and cost can be prevented.

The above embodiment is a preferred example of the present invention, and the present invention is not limited thereto. The embodiment can be appropriately changed without departing from the gist of the present invention.

Although embodiments of the present invention have been described and illustrated in detail, the disclosed embodiments are made for purposes of illustration and example only and not limitation. The scope of the present invention should be interpreted by terms of the appended claims.

What is claimed is:

1. An image processing apparatus comprising:
    an extractor that divides image data in block units and extracts a maximum value and a minimum value of each block from the compressed image data by using a maximum value and a minimum value of pixel values of pixels included in each block;
    an edge detector that detects an edge at a front end or a rear end of an image by using the maximum value and the minimum value of each block extracted by the extractor;
    a correction value calculator that corrects the maximum value, or the maximum value and the minimum value of each block positioned in a certain range from the front end or the rear end of the image according to a distance from the edge detected by the edge detector and calculates a maximum value and a minimum value after the correction; and
    a converter that determines a conversion formula of a pixel value by using the maximum value and the minimum value before the correction of each block and the maximum value and the minimum value after the correction calculated by the correction value calculator and converts each pixel value of the image data obtained by decompressing the compressed data according to the determined conversion formula so as to apply sweeping correction.

2. The image processing apparatus according to claim 1, wherein
    the converter determines the conversion formula different in each of cases including (i) when the maximum value before the correction is equal to or less than a first threshold, (ii) when a difference between the maximum value before the correction and the minimum value before the correction is equal to or less than a second threshold although the maximum value before the correction exceeds the first threshold, and (iii) when the maximum value before the correction exceeds the first threshold and the difference between the maximum value before the correction and the minimum value before the correction exceeds the second threshold, so that the minimum value of each block is equal to or less than the maximum value.

3. The image processing apparatus according to claim 2, wherein
    the converter determines to use a conversion formula expressed by the following formula (1), (i) when the maximum value before the correction is equal to or less than the first threshold:

$$\text{Cout} = \text{Cin} \tag{1}$$

wherein, in the formula (1), Cin represents a pixel value before conversion, and Cout represents a pixel value after conversion.

4. The image processing apparatus according to claim 2, wherein
    the converter determines to use a conversion formula expressed by the following formula (2), (ii) when the difference between the maximum value before the correction and the minimum value before the correction is equal to or less than the second threshold although the maximum value before the correction exceeds the first threshold:

$$\text{Cout} = \text{Cin} \times (\text{Max*}/\text{Max}) \tag{2}$$

wherein, in the formula (2), Cin represents a pixel value before conversion, Cout represents a pixel value after conversion, Max represents the maximum value before the correction, and Max* represents the maximum value after the correction.

5. The image processing apparatus according to claim 2, wherein
the converter determines to use a conversion formula expressed by the following formula (3), (iii) when the maximum value before the correction exceeds the first threshold and the difference between the maximum value before the correction and the minimum value before the correction exceeds the second threshold:

$$Cout=(Cin-min)\times\{(Max^*-min^*)/(Max-min)\}+min^* \quad (3)$$

wherein, in the formula (3), Cin represents a pixel value before conversion, and Cout represents a pixel value after conversion, Max represents the maximum value before the correction, Max* represents the maximum value after the correction, min represents the minimum value before the correction, and min* represents the minimum value after the correction.

6. The image processing apparatus according to claim 1, further comprising:
a decompressor that decompresses the compressed image data; and
an image processor that applies image processing to the image data decompressed by the decompressor, wherein
the converter converts each pixel value of the image data which has been decompressed by the decompressor and image-processed by the image processor.

7. An image processing method comprising:
dividing image data in block units and extracting a maximum value and a minimum value of each block from the compressed image data by using a maximum value and a minimum value of pixel values of pixels included in each block;
detecting an edge at a front end or a rear end of an image by using the maximum value and the minimum value of each block which have been extracted;
correcting the maximum value, or the maximum value and the minimum value of each block positioned in a certain range from the front end or the rear end of the image according to a distance from the detected edge and calculating a maximum value and a minimum value after the correction; and
determining a conversion formula of a pixel value by using the maximum value and the minimum value before the correction of each block and the calculated maximum value and minimum value after the correction and converting each pixel value of the image data obtained by decompressing the compressed image according to the determined conversion formula so as to apply sweeping correction.

8. The image processing method according to claim 7, wherein
determining the conversion formula different in each of cases including (i) when the maximum value before the correction is equal to or less than a first threshold, (ii) when a difference between the maximum value before the correction and the minimum value before the correction is equal to or less than a second threshold although the maximum value before the correction exceeds the first threshold, and (iii) when the maximum value before the correction exceeds the first threshold and the difference between the maximum value before the correction and the minimum value before the correction exceeds the second threshold, so that the minimum value of each block is equal to or less than the maximum value.

9. The image processing method according to claim 8, wherein
in the correction, it is determined to use a conversion formula expressed by the following formula (1), (i) when the maximum value before the correction is equal to or less than the first threshold:

$$Cout=Cin \quad (1)$$

wherein, in the formula (1), Cin represents a pixel value before conversion, and Cout represents a pixel value after conversion.

10. The image processing method according to claim 8, wherein
in the correction, it is determined to use a conversion formula expressed by the following formula (2), (ii) when the difference between the maximum value before the correction and the minimum value before the correction is equal to or less than the second threshold although the maximum value before the correction exceeds the first threshold:

$$Cout=Cin\times(Max^*/Max) \quad (2)$$

wherein, in the formula (2), Cin represents a pixel value before conversion, Cout represents a pixel value after conversion, Max represents the maximum value before the correction, and Max* represents the maximum value after the correction.

11. The image processing method according to claim 8, wherein
it is determined to use a conversion formula expressed by the following formula (3), (iii) when the maximum value before the correction exceeds the first threshold and the difference between the maximum value before the correction and the minimum value before the correction exceeds the second threshold:

$$Cout=(Cin-min)\times\{(Max^*-min^*)/(Max-min)\}+min^* \quad (3)$$

wherein, in the formula (3), Cin represents a pixel value before the conversion, Cout represents a pixel value after the conversion, Max represents the maximum value before the correction, Max* represents the maximum value after the correction, min represents the minimum value before the correction, and min* represents the minimum value after the correction.

12. The image processing method according to claim 7, further comprising:
decompressing the compressed image data; and
applying image processing to the decompressed image data, wherein
in the correction, each pixel value of the image data which has been image-processed is converted to apply the sweeping correction.

* * * * *